US005295224A

United States Patent [19]

Makamura et al.

[11] Patent Number: 5,295,224

[45] Date of Patent: Mar. 15, 1994

[54] LINEAR PREDICTION SPEECH CODING WITH HIGH-FREQUENCY PREEMPHASIS

[75] Inventors: Makio Makamura; Yoshihiro Unno, both of Tokyo, Japan

[73] Assignee: NEC Corporation, Tokyo, Japan

[21] Appl. No.: 765,737

[22] Filed: Sep. 26, 1991

[30] Foreign Application Priority Data

Sep. 26, 1990 [JP] Japan ................................ 2-256493

[51] Int. Cl.[5] .......................... G10L 3/02; H04B 1/66

[52] U.S. Cl. ................................ 315/2.32; 395/2.28; 395/2.29

[58] Field of Search ........................ 395/2; 381/29-36, 381/46, 47

[56] References Cited

U.S. PATENT DOCUMENTS

| | | | |
|---|---|---|---|
| 4,899,385 | 2/1990 | Ketchum et al. | 395/2 |
| 4,933,957 | 6/1990 | Bottau et al. | 395/2 |
| 4,965,789 | 10/1990 | Bottau et al. | 381/31 |
| 5,007,092 | 4/1991 | Galand et al. | 381/36 |
| 5,142,583 | 8/1992 | Galand et al. | 381/38 |

FOREIGN PATENT DOCUMENTS

| | | | |
|---|---|---|---|
| 0331858 | 8/1988 | Japan | G10L 9/14 |
| WO86/02726 | 5/1986 | World Int. Prop. O. | G10L 5/00 |

OTHER PUBLICATIONS

"Code-excited linear prediction: High quality speech at very low bit rates", ICASSP, vol. 3, pp. 937-940, Mar. 1985.

Signal Processing IV: Theories and Applications (Proceedings of EUSIPCO-88, 4th European Signal Processing Conference, Grenoble, Sep. 5-8, 1988), vol. II, pp. 871-874, F. Bottau et al: "On different vector predictive coding schemes and their application to low bit rates speech coding."

ICASSP'89 (1989 Intl. Conf. on Acoustics, Speech, and Signal Processing, Glasgow, May 23-26, 1989) vol. 1, pp. 132-135, IEEE, J. Menez et al.: "Adaptive code excited linear predictive coder."

IEEE Journal on Selected Areas in Communications, vol. 6, No. 2, Feb. 1988, pp. 353-363, P. Kroon et al.: "A class of analysis-by-synthesis predictive coders for high quality speech coding at rates between 4.8 and 16 kbits/s."

ICASSP'86 (IEEE-IECEJ-ASJ Int. Conf. on Acoustics, Speech, and Signal Processing, Apr. 7-11, 1986), vol. 4, pp. 3055-3057, IEEE, G. Davidson et al.: "Complexity reduction methods for vector excitation coding."

ICASSP'89 (1989) Intl. Conf. on Acoustics, Speech and Signal Processing, Glasgow, May 23-26, 1989) vol. 1, pp. 53-56, IEEE, A Bergstrom et al: "Codebook driven glottal pulse analysis."

ICASSP'90 (1990 Int. Conf. on Acoustics, Speech, and Signal Processing, Albuquerque, N.M., Apr. 3-6, 1990) vol. 1, pp. 241-244, T. Taniguchi et al: "Principal axis extracting vector excitation coding: high quality speech at 8 kb.s."

*Primary Examiner*—David D. Knepper
*Attorney, Agent, or Firm*—Sughrue, Mion, Zinn, Macpeak & Seas

[57] ABSTRACT

High frequency components of input digital speech samples are emphasized by a preemphasis filter (11). From the preemphasized samples a spectral parameter ($a_i$) is derived at frame intervals. The input digital samples are weighted by a weighting filter (13) according to a characteristic that is inverse to the characteristic of the preemphasis filter (11) and is a function of the spectral parameter ($a_i$). A codebook (18, 19) is searched for an optimum fricative value in response to a pitch parameter that is derived by an adaptive codebook (16) from a previous fricative value (v(n)) and a difference between the weighted speech samples and synthesized speech samples which are, in turn, derived from past pitch parameters and optimum fricative values, whereby the difference is reduced to a minimum. Index signals representing the spectral parameter, pitch parameter and optimum fricative value are multiplexed into a single data stream.

4 Claims, 4 Drawing Sheets

LINEAR PREDICTION SPEECH CODING WITH HIGH-FREQUENCY PREEMPHASIS

RELATED APPLICATION

This application is related to co-pending U.S. patent application Ser. No. 07/658,473, K. Ozawa, filed Feb. 20, 1991, titled "Speech Coder", and assigned to the same assignee as the present application.

BACKGROUND OF THE INVENTION

The present invention relates generally to speech coding techniques, and more specifically to a speech conversion system using a low-rate linear prediction speech coding/decoding technique.

As described in a paper by M. Schroeder and B. Atal, "Code-excited linear prediction: High quality speech at very low bit rates", M. Schroeder and B. Atal (ICASSP Vol. 3, pages 937–940, March 1985), speech samples digitized at 8-kHz sampling rate are converted to digital samples of 4.8 to 8 kbps rates by extracting spectral parameters representing the spectral envelope of the speech samples from frames at 20-ms intervals and deriving pitch parameters representing the long-term correlations of pitch intervals from subframes at 50-ms intervals. Fricative components of speech are stored in a codebook. Using the pitch parameter a search is made through the codebook for an optimum value that minimizes the difference between the input speech samples and speech samples which are synthesized from a sum of the optimum codebook values and the pitch parameters. Signals indicating the spectral parameter, pitch parameter, and codebook value are transmitted or stored as index signals at bit rates in the range between 4.8 and 8 kbps.

However, one disadvantage of linear prediction coding is that it requires a large amount of computations for analyzing voiced sounds, an amount that exceeds the capability of the state-of-the-art hardware implementation such as 16-bit fixed point DSP (digital signal processing) LSI packages. With the current technology, LPC analysis is not satisfactory for high-pitched voiced sounds.

SUMMARY OF THE INVENTION

It is therefore an object of the present invention to provide a speech encoder having reduced computations for LPC analysis to enable hardware implementation with limited computational capability.

In a speech encoder of the present invention, high-frequency components of input digital speech samples of an underlying analog speech signal are preemphasized according to a predefined frequency response characteristic. From the preemphasized speech samples a spectral parameter is derived at frame intervals to represent the spectrum envelope of the preemphasized speech samples. The input digital samples are weighted according to a characteristic that is inverse to the preemphasis characteristic and is a function of the spectral parameter. A search is made through a codebook for an optimum fricative value in response to a pitch parameter which is derived by an adaptive codebook from a previous fricative value and a difference between the weighted speech samples and synthesized speech samples which are, in turn, derived from pitch parameters and optimum fricative values. The optimum fricative value is one that reduces the difference to a minimum. Index signals representing the spectral parameter, pitch parameter and optimum fricative value are generated at frame intervals and multiplexed into a single data bit stream at low bit rates for transmission or storage. In a speech decoder, the data bit stream is decomposed into individual index signals. A codebook is accessed with a corresponding index signal to recover the optimum fricative value which is combined with a pitch parameter derived from an adaptive codebook in response to the pitch parameter index signal, thus forming an input signal to a synthesis filter having a characteristic that is a function of the decomposed spectral parameter. The output of the synthesis filter is deemphasized according to a characteristic inverse to the preemphasis characteristic.

In a preferred embodiment of the speech encoder, the amount of computations is reduced by converting the spectral parameter to a second spectral parameter according to a prescribed relationship between the second parameter and a combined value of the first spectral parameter and a parameter representing the response of the high-frequency preemphasis. The second spectral parameter is used to weight the digital speech samples and the first spectral parameter is multiplexed with the other index signals. In the speech decoder of the preferred embodiment, the first spectral parameter is converted to the second spectral parameter in the same manner as in the speech encoder. A synthesis filter is provided having a characteristic that is inverse to the preemphasis characteristic and is a function of the second spectral parameter to synthesize speech samples from a sum of the pitch parameter and the optimum fricative value.

BRIEF DESCRIPTION OF THE DRAWINGS

The present invention will be described in further detail with reference to the accompanying drawings, in which.

DETAILED DESCRIPTION

Figure 1:
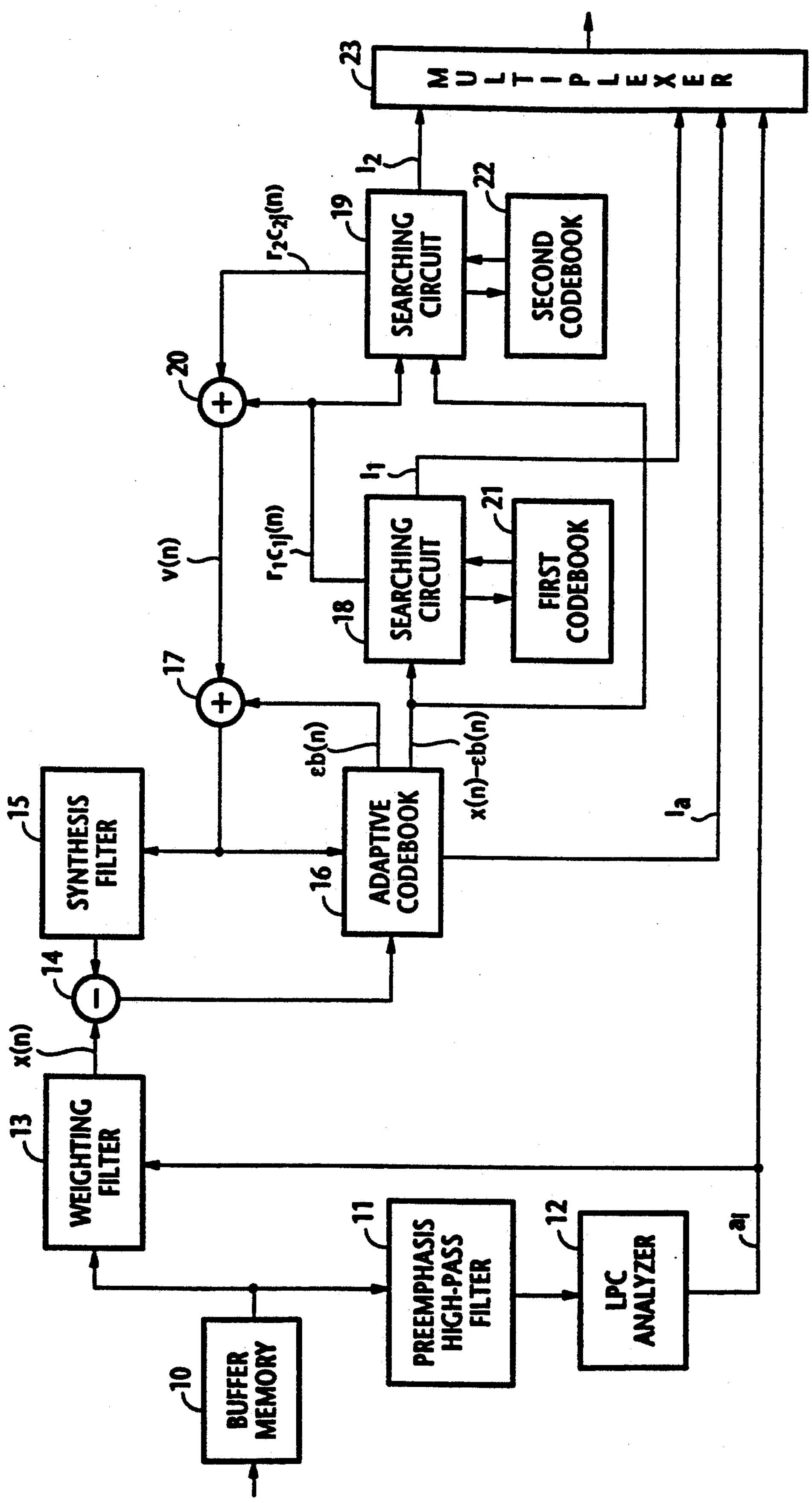
FIG. 1 is a block diagram of a speech encoder according to the present invention.

Referring now to FIG. 1, there is shown a speech encoder according to one embodiment of the present invention. An analog speech signal is sampled at 8 kHz, converted to digital form and formatted into frames or 20-ms duration each containing N speech samples. The speech samples of each frame are stored in a buffer memory 10 and applied to a preemphasis high-pass filter 11. Preemphasis filter 11 has a transfer function H(z) of the form:

$$H(z) = 1 - \beta z^{-1} \quad (1)$$

where $\beta$ is a preemphasis filter coefficient ($0 < \beta < 1$) and z is a delay operator. The effect of this high frequency emphasis is to make signal processing less difficult for high frequency speech components which are abundant in utterances from women and children.

To the output of buffer memory 10 is connected a weighting filter 13 having a weighting function W(z) of the form:

$$W(z) = \frac{1 - \sum_{i=0}^{P-1} a_i z^{-i}}{1 - \sum_{i=0}^{P-1} a_i \gamma^i z^{-i}} \times \frac{1 - \beta z^{-1}}{1 - \beta\gamma z^{-1}} \quad (2)$$

where $a_i$ represents the spectral envelope of ith speech sample of the frame, or ith order linear predictor, $\gamma$ is a coefficient ($0<\gamma<1$), P represents the order of the spectral parameter.

The output of LPC analyzer 12 is applied to weighting filter 13 to control its weighting coefficient, so that the N samples x(n) of each frame are scaled by weighting filter 13 according to Equation (2) as a function of the spectral parameter $a_i$. Since the LPC analysis is performed on the high-frequency emphasized speech samples, weighting filter 13 compensates for this emphasis by the inverse filter function represented by a term of Equation (2).

The output of weighting filter 13 is applied to a subtractor 14 in which it is combined with the output of a synthesis filter 15 having a filter function given by:

$$S(z) = 1/\left(1 - \sum_{i=0}^{P-1} a_i \cdot z^{-1}\right)(1 - \beta \cdot z^{-1}) \quad (3)$$

Subtractor 14 produces a difference signal indicating the power of error between a current frame and a synthesized frame. The difference signal is applied to a known adaptive codebook 16 to which the output of an adder 17 is also applied. Adaptive codebook 16 divides each frame of the output of subtractor 14 into subframes of 5-ms duration. Between the two input signals of previous subframes the adaptive codebook 16 provides cross-correlation and auto-correlation and derives at subframe intervals a pitch parameter $\epsilon$.b(n) representative of the long-term correlation between past and present pitch intervals (where $\epsilon$ indicates the pitch gain and b(n) the pitch interval) and further generates at subframe intervals a signal x(n)−$\epsilon$.b(n) which is proportional to the residual difference {x(n)−$\epsilon$.b(n)}w(n). Adaptive codebook 16 further generates a pitch parameter index signal $I_a$ at frame intervals to represent the pitch parameters of each frame and supplies it to a multiplexer 23 for transmission or storage. Details of the adaptive codebook are described in a paper by Kleijin et al., titled "Improved speech quality and efficient vector quantization in SELP", ICASSP, Vol. 1, pages 155–158, 1988.

The pitch parameter $\epsilon$.b(n) is applied to adder 17 and the signal x(n) −$\epsilon$.b(n) is applied to first and second searching circuits 18 and 19, which are known in the speech coding art, for making a search through first and second codebooks 21 and 22, respectively. The first codebook 21 stores codewords representing fricatives which are obtained by a long-term learning process in a manner as described in a paper by Buzo et al., titled "Speech coding based upon vector quantization" (IEEE Transaction ASSP, Vol. 28, No. 5, pages 562–574, October 1980). The second codebook 22 is generally similar to the first codebook 21. However, it stores codewords of random numbers to make the searching circuit 19 less dependent on the training data.

As described in detail below, codebooks 21 and 22 are searched for optimum codewords $c_{1j}(n)$, $c_{2k}(n)$ and optimum gains $r_1$, $r_2$ so that an error signal E given below is reduced to a minimum (where j is a variable in the range between 1 and a maximum number of codewords for codewords $c_1$ and k is a variable in the range between 1 and a maximum number of codewords for codewords $c_2$). The codeword signal indicating the optimum codeword $c_{1j}(n)$ and its gain $r_1$ is supplied from searching circuit 18 to a second searching circuit 19 as well as to an adder 20 in which it is summed with a codeword signal representing the optimum codeword $c_{2k}(n)$ and its gain $r_2$ from searching circuit 19 to produce a sum v(n) given by;

$$v(n) = r_1 \cdot c_{1j}(n) + r_2 \cdot c_{2k}(n) \quad (4)$$

The output of adder 20 is fed to the adder 17 and summed with the pitch parameter $\epsilon$.b(n). On the other hand, the address signals used by the searching circuits 18 and 19 for accessing the optimum codewords and gain values are supplied as codebook index signals $I_1$ and $I_2$, respectively, to multiplexer 23 at frame intervals.

Searching circuits 18 and 19 operate to detect optimum codewords and gain values from codebooks 21 and 22 so that the error E given by the following formula is reduced to a minimum:

$$E = \sum_{i=0}^{N-1} [\{x(n) - \epsilon \cdot b(n) - r_1 \cdot c_{1j}(n) \cdot s(n) - r_2 \cdot c_{2k}(n) \cdot s(n)\} w(n)]^2 \quad (5)$$

where s(n) is an impulse response of the filter function S(z) of synthesis filter 15.

More specifically, searching circuit 18 makes a search for data $r_1$ and $c_{1j}(n)$ which minimize the following error component $E_1$:

$$E_1 = \sum_{i=0}^{N-1} [\{e_w(n) - r_1 \cdot c_{1j}(n) \cdot s(n)\} w(n)]^2 \quad (6)$$

where, $e_w(n)$ is the residual difference {x(n)−$\epsilon$.b(n)}w(n). By partially differentiating Equation (6) with respect to gain $r_1$ and equating it to zero, the following Equations hold:

$$r_1 = G_j / C_j \quad (7)$$

where, $G_j$ and $C_j$ are given respectively by:

$$G_j = \sum_{i=0}^{N-1} e_w(n) \cdot c_{1j}(n) \cdot s(n)$$

$$C_j = \sum_{i=0}^{N-1} [c_{j1}(n) \cdot s(n)]^2$$

Equation (6) can be rewritten as:

$$E_1 = \sum_{i=0}^{N-1} e_w(n)^2 - C_j^2 / C_j \quad (8)$$

Since the first term of Equation (8) is a constant, a codeword $c_{1j}(n)$ is selected from codebook 21 such that it maximizes the second term of Equation (8).

The second searching circuit 19 receives the codeword signal from the first searching circuit as well as the residual difference x(n)−$\epsilon$.b(n) from the adaptive codebook 16 to make a search through the second codebook 22 in a known manner and detects the optimum codeword $c_{2k}(n)$ and the optimum gain $r_2$ of the codeword.

With regard to the searching circuits 18 and 19, the aforesaid co-pending U.S. Patent Application is incorporated herein as a reference material for implementation.

The output of adder 17 is supplied at subframe intervals to the synthesis filter 15 in which synthesized N speech samples x'(n) are derived from successive frames according to the following known formula:

$$x'(n) = b(n) + \sum_{i=1}^{p} a_i' \cdot \delta_i \cdot (n-1) \tag{9}$$

where $a_i'$ is a spectral parameter obtained from interpolations between successive frames and p represents the order of the interpolated spectral parameter, and b(n) is given by:

$$b(n) = \begin{cases} v(n) & (1 \leqq n \leqq N) \\ 0 & (N+1 \leqq n \leqq 2N) \end{cases} \tag{10}$$

It is seen from Equations (9) and (10) that the synthesized speech samples contain a sequence of data bits representing v(n) and a sequence of binary zeros which appear at alternate frame intervals. The alternate occurrence of zero-bit sequences is to ensure that a current frame of synthesized speech samples is not adversely affected by a previous frame. The synthesis filter 15 proceeds to weight the synthesized speech samples x'(n) with the filter function S(z) of Equation (3) to synthesize weighted speech samples of a previous frame for coupling to the subtractor 14 by which the power of error E is produced, representing the difference between the previous frame and a current frame from weighting filter 13 having the filter function W(z) of Equation (2).

The output $a_i$ of LPC analyzer 12 and the residual difference $x(n)-\epsilon.b(n)$ are supplied to multiplexer 23 as index signals and multiplexed with the index signals $l_1$ and $l_2$ from searching circuits 18, 19 into a single data bit stream at a bit rate in the range of 4.8 kbps and 8 kbps and sent over a transmission line to a site of signal reception or recorded into a suitable storage medium.

Figure 2:
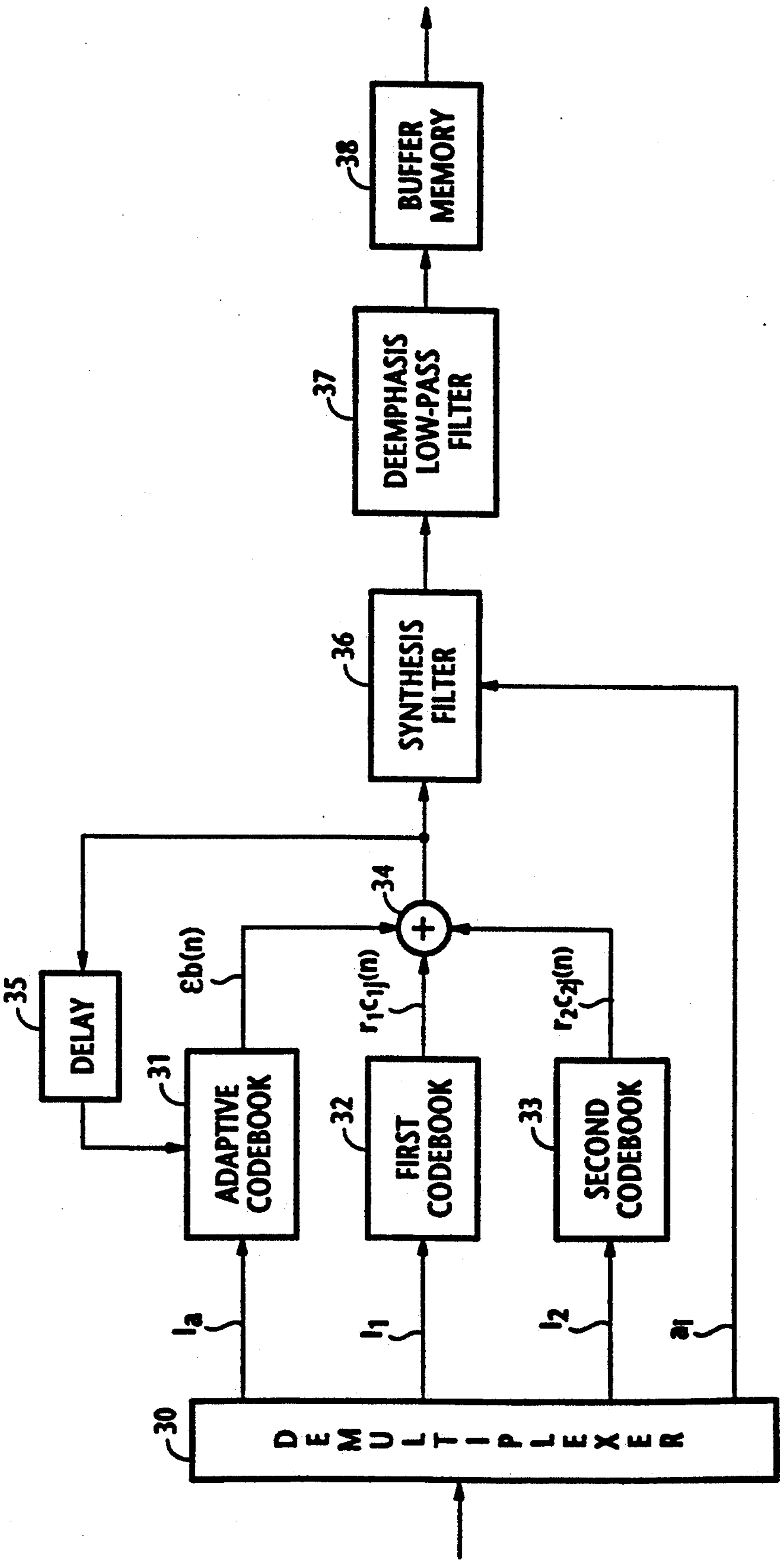
FIG. 2 is a block diagram of a speech decoder according to the present invention.

At the site of signal reception or storage, a speech decoder as shown in FIG. 2 is provided. The speech decoder includes a demultiplexer 30 in which the multiplexed data bit stream is decomposed into the individual components $l_a$, $l_1$, $l_2$ and $a_i$, which are applied respectively to an adaptive codebook 31, a first codebook 32, a second codebook 33 and a synthesis filter 36. Codeword signals $r_1c_{1j}(n)$ and $r_2c_{2k}(n)$ are respectively recovered by codebooks 32 and 33 and summed with the output of adaptive codebook 31 and applied via a delay circuit 34 to adaptive codebook 31 so that it reproduces the pitch parameter $\epsilon.b(n)$. As a function of the pitch parameter $a_i$ supplied from demultiplexer 30, the synthesis filter 36 transforms the output of adder 34 according to the following transfer function:

$$S_1(z) = 1/\left(1 - \sum_{i=0}^{P-1} a_i \cdot z^{-1}\right) \tag{11}$$

The output of synthesis filter 36 is coupled to a deemphasis low-pass filter 37 having the following transfer function which is inverse to that of preemphasis filter 11:

$$S_2(Z)=1/(1=\beta.z^{-1}) \tag{12}$$

Since the combined transfer function of the synthesis filter 36 and deemphasis filter 37 is equal to the transfer function S(z) of the encoder's weighting filter 13, a replica of the original digital speech samples x(n) appears at the output of deemphasis low-pass filter 37. A buffer memory 38 is coupled to the output of this deemphasis filter to store the recovered speech samples at frame intervals for conversion to analog form.

Figure 3:
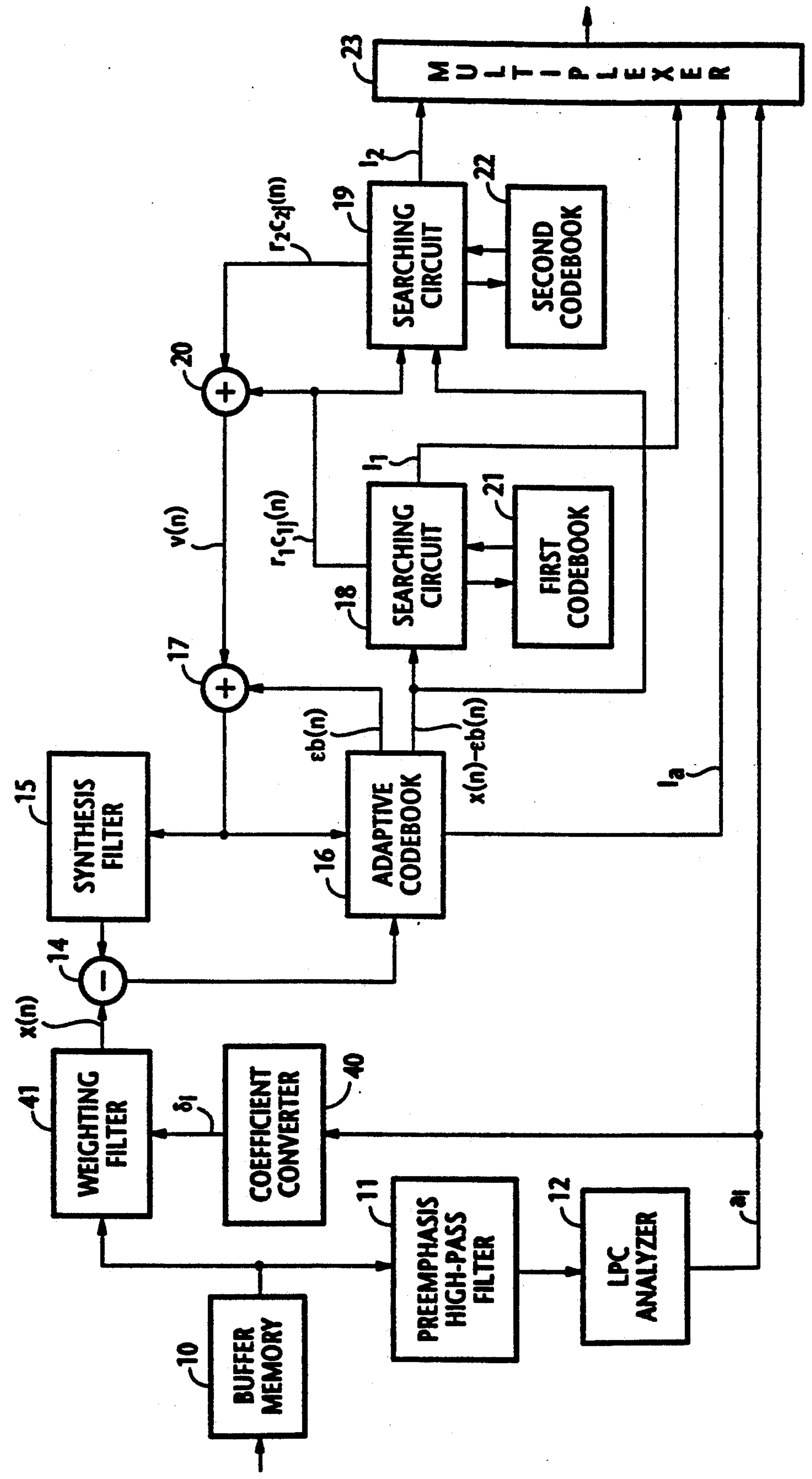
FIG. 3 is a block diagram of a modified speech encoder of the present invention.

A modification of the present invention is shown in FIG. 3. This modification differs from the previous embodiment by the provision of a weight filter shown at 41 instead of the filter 13 and a coefficient converter 40 connected between LPC analyzer 12 and weighting filter 41. Coefficient converter 40 transforms the spectral parameter $a_i$ to $\delta_i$ according to the following Equations:

$$\delta_1=\alpha_1+\beta \tag{13a}$$

$$\delta_p=\alpha_p+\alpha_{p-1}.\beta \tag{13b}$$

$$\delta_{p+1}=-\alpha_p.\beta \tag{13c}$$

Since the coefficient conversion incorporates the high-frequency preemphasis factor $\beta$, the function W'(z) of weighting filter 41 can be expressed as follows:

$$W'(z) = \left(1 - \sum_{i=0}^{P} \delta_i \cdot z^{-1}\right) / \left(1 - \sum_{i=0}^{P} \delta_i \cdot \gamma^i z^{-1}\right) \tag{14}$$

By coupling the output of coefficient converter 40 as a spectral parameter to weighting filter 41, the speech samples x(n) are weighted according to the function W'(z) and supplied to subtractor 14. In this way, the amount of computations which the weighting filter 41 is required to perform can be reduced significantly in comparison with the computations required by the previous embodiment.

Figure 4:
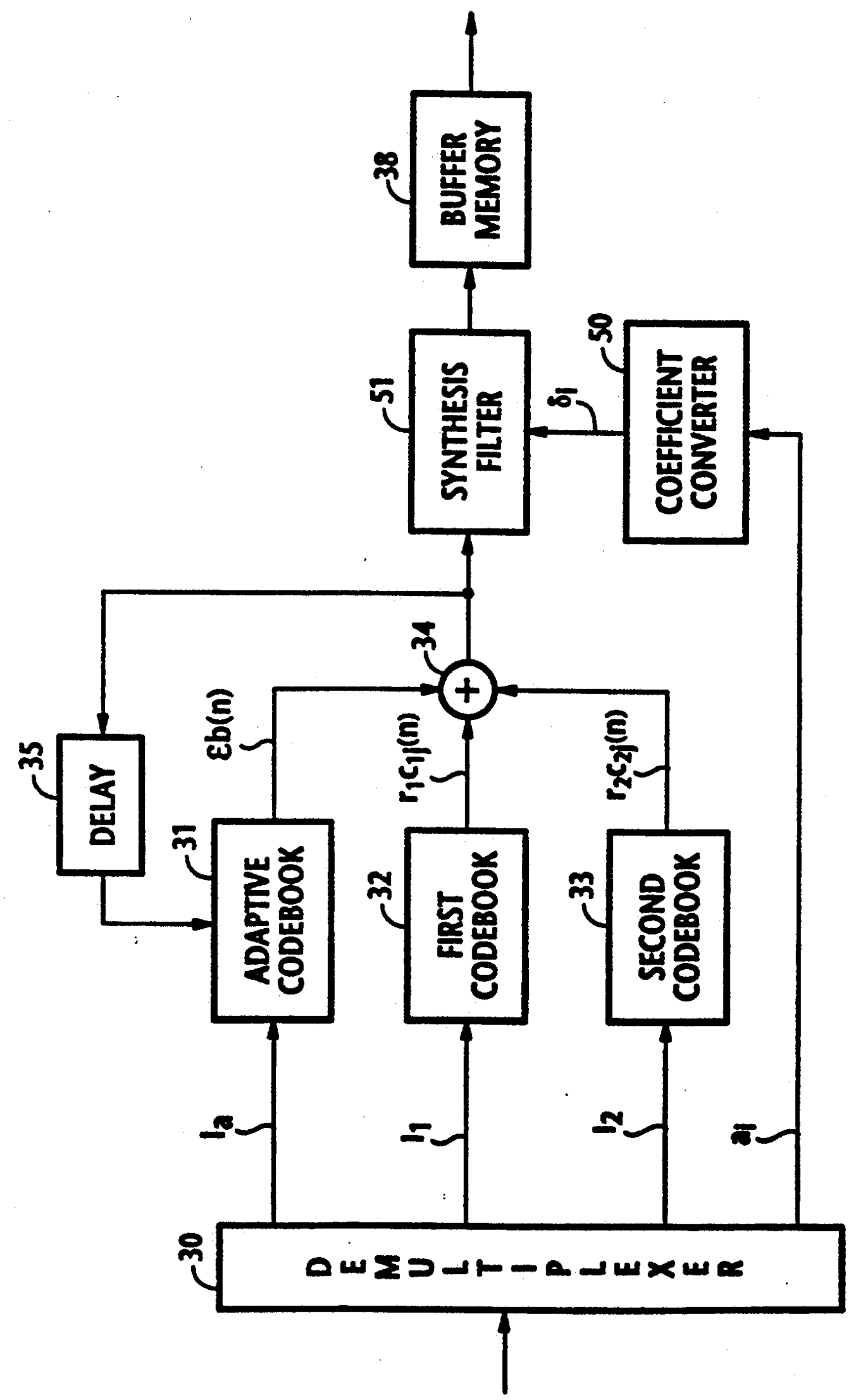
FIG. 4 is a block diagram of a modified speech decoder associated with the speech encoder of FIG. 3.

As shown in FIG. 4, the speech decoder associated with the speech encoder of FIG. 3 differs from the embodiment of FIG. 1 in that it includes a coefficient converter 50 identical to the encoder's coefficient converter 40 and a synthesis filter 51 having the filter function $S_3(z)$ of the form:

$$S_3(z) = 1/\left(1 - \sum_{i=0}^{P} \delta_i \cdot z^{-1}\right) \tag{15}$$

This speech decoder further differs from the previous embodiment in that it dispenses with the deemphasis low-pass filter 37 by directly coupling the output of synthesis filter 51 to buffer memory 38. The spectral parameter $a_i$ from the demultiplexer 30 is converted by coefficient converter 50 to $\delta_i$ according to Equations (13a), (13b), (13c) and supplied to synthesis filter 51 as a spectral parameter. The output of adder 34 is weighted with the filter function $S_3(z)$ by filter 51 as a function of the spectral parameter $\delta_i$. As a result of the coefficient conversion, the amount of computations required for the speech decoder of this embodiment is significantly reduced in comparison with the speech decoder of FIG. 2.

What is claimed is:

1. A speech encoder comprising:

preemphasis means for receiving input digital speech samples of an underlying analog speech signal and emphasizing higher frequency components of the speech samples according to a predefined frequency response characteristic;

linear prediction analyzer means for receiving said preemphasized speech samples and deriving therefrom at frame intervals a spectral parameter representing a spectrum envelope of said preemphasized speech samples;

weighting means for weighting said input digital speech samples according to a characteristic inverse to the characteristic of said preemphasis means as a function of said spectral parameter;

a subtractor for detecting a difference between the weighted speech samples and synthesized speech samples;

codebook means for storing data representing fricatives;

search means for detecting optimum data from said codebook means as a function of a pitch parameter representing a pitch interval of said input speech samples so that said difference is reduced to a minimum and generating a codebook index signal representing said optimum data at frame intervals;

adaptive codebook means for deriving said pitch parameter at subframe intervals from said difference and said optimum data and generating a pitch parameter index signal at frame intervals;

speech synthesis means for deriving said synthesized speech samples from said pitch parameter and said optimum data; and means for multiplexing said spectral parameter, said pitch parameter index signal and said codebook index signal into a single data stream.

2. A speech encoder comprising:

preemphasis means for receiving input digital speech samples of an underlying analog speech signal and emphasizing higher frequency components of the speech samples according to a predefined frequency response characteristic;

linear prediction analyzer means for receiving said preemphasized speech samples and deriving therefrom at frame intervals a first spectral parameter representing a spectrum envelope of said preemphasized speech samples;

parameter conversion means for converting the first spectral parameter to a second spectral parameter according to a prescribed relationship between said second parameter and a combined value of said first spectral parameter and a parameter representing the frequency response of said preemphasis means;

weighting means for weighting said input digital speech samples according to a characteristic inverse to the characteristic of said preemphasis means as a function of said second spectral parameter;

a subtractor for detecting a difference between the weighted speech samples and synthesized speech samples;

codebook means for storing data representing fricatives;

search means for detecting optimum data from said codebook means as a function of a pitch parameter representing a pitch interval of said input speech samples so that said difference is reduced to a minimum and generating a codebook index signal representing said optimum data at frame intervals;

adaptive codebook means for deriving said pitch parameter at subframe intervals from said difference and said optimum data and generating a pitch parameter index signal at frame intervals;

speech synthesis means for deriving said synthesized speech samples from said pitch parameter and said optimum data; and means for multiplexing said first spectral parameter, said pitch parameter index signal and said codebook index signal into a single data stream.

3. A speech conversion system comprising:

preemphasis means for receiving input digital speech samples of an underlying analog speech signal and emphasizing higher frequency components of the speech samples according to a predefined frequency response characteristic;

linear prediction analyzer means for receiving said preemphasized speech samples and deriving therefrom at frame intervals a spectral parameter representing a spectrum envelope of said preemphasized speech samples;

weighting means for weighting said input digital speech samples according to a characteristic inverse to the characteristic of said preemphasis means as a function of said spectral parameter;

a subtractor for detecting a difference between the weighted speech samples and synthesized speech samples;

first codebook means for storing data representing fricatives;

search means for detecting optimum data from said first codebook means as a function of a pitch parameter representing a pitch interval of said speech samples so that said difference is reduced to a minimum and for generating a codebook index signal representing said optimum data at frame intervals;

second, adaptive codebook means for deriving said pitch parameter at subframe intervals from said difference and said optimum data and for generating a pitch parameter index signal at frame intervals;

first speech synthesis means for deriving said synthesized speech samples from said pitch parameter and said optimum data;

multiplexer means for multiplexing said spectral parameter, said pitch parameter index signal and said codebook index signal into a single data stream;

demultiplexer means for demultiplexing said data stream into said spectral parameter, said pitch parameter index signal and said codebook index signal;

third codebook means for writing said optimum data therefrom at subframe intervals as a function of the demultiplexed codebook index signal;

fourth adaptive codebook means for writing a pitch parameter at subframe intervals in response to the demultiplexed pitch parameter index signal and a sum of an output of the fourth adaptive codebook means and said optimum data of the third codebook means; optimum data from the stored fricatives representative data at subframe intervals as a function of the demultiplexed codebook index signal;

second speech synthesis means for synthesizing speech samples from the optimum data of said third codebook means and from said pitch parameter from said fourth adaptive codebook means; and;

deemphasis means for emphasizing the speech samples synthesized by the second speech synthesis means according to a characteristic inverse to the characteristic of said preemphasis means.

4. A speech conversion system comprising:

preemphasis means for receiving input digital speech samples of an underlying analog speech signal and emphasizing higher frequency components of the speech samples according to a predefined frequency response characteristic;

linear prediction analyzer means for receiving said preemphasized speech samples and deriving therefrom at frame intervals a first spectral parameter representing a spectrum envelope of said preemphasized speech samples;

first parameter conversion means for converting the first spectral parameter to a second spectral parameter according to a prescribed relationship between said second spectral parameter and a combined value of said first spectral parameter and a parameter representing the frequency response of said preemphasis means;

weighting means for weighting said input digital speech samples according to a characteristic inverse to the characteristic of said preemphasis means as a function of said second spectral parameter;

a subtractor for detecting a difference between the weighted speech samples and synthesized speech samples;

first codebook means for storing data representing fricatives;

search means for detecting optimum data from said first codebook means as a function of a pitch parameter representing a pitch interval of said input speech samples so that said difference is reduced to a minimum and generating a codebook index signal representing said optimum data at frame intervals;

second, adaptive codebook means for deriving said pitch parameter at subframe intervals from said difference and said optimum data and for generating a pitch parameter index signal at frame intervals;

first speech synthesis means for deriving said synthesized speech samples from said pitch parameter and said optimum data;

multiplexer means for multiplexing said first spectral parameter, said pitch parameter index signal and said codebook index signal into a single data stream;

demultiplexer means for demultiplexing said data stream into said spectral parameter, said pitch parameter index signal and said codebook index signal;

third codebook means for writing said optimum data therefrom at subframe intervals as a function of the demultiplexed codebook index signal;

second parameter conversion means for converting the demultiplexed first spectral parameter to said second spectral parameter in a manner identical to said first parameter conversion means;

fourth adaptive codebook means for writing a pitch parameter at subframe intervals in response to the demultiplexed pitch parameter index signal and a sum of an output of the fourth adaptive codebook means and said optimum data of the third codebook means; and second speech synthesis means having a characteristic that is inverse to the characteristic of said preemphasis means and is a function of said second spectral parameter of the second parameter conversion means for deriving synthesized speech samples from the optimum data of said second codebook means and from the pitch parameter from said fourth adaptive codebook means.

* * * * *

UNITED STATES PATENT AND TRADEMARK OFFICE

CERTIFICATE OF CORRECTION

PATENT NO. : 5,295,224

DATED : March 15, 1994

INVENTOR(S) : Makio Nakamura, et. al.

It is certified that error appears in the above-indentified patent and that said Letters Patent is hereby corrected as shown below:

Title page, item [75], inventor: delete "Makamura" and insert--Nakamura--.

Col. 4, line 58, delete "$C_j^2$" and insert --$G_j^2$--.

Col. 5, lines 42 and 43, delete "$1_1$ and $1_2$" and insert --$l_1$ and $l_2$--;

Col. 5, line 51, delete "$1_a$, $1_1$, $1_2$" and insert --$l_a$, $l_1$, $l_2$--;

Col. 5, line 54, delete "$C_{1j}$" and insert --$C_{1j}$--.

Col. 6, line 20, delete "$a_j$ to $\delta_j$" and insert --$a_1$ to $\delta_1$--;

Col. 6, line 62, delete "$\delta_j$" and insert --$\delta_i$--;

Col. 6, line 66, delete "$\delta_j$" and insert --$\delta_i$--.

Signed and Sealed this

Twenty-fourth Day of January, 1995

Attest:

Bruce Lehman

BRUCE LEHMAN

*Attesting Officer*

*Commissioner of Patents and Trademarks*